United States Patent [19]
McCann et al.

[11] 3,757,055
[45] Sept. 4, 1973

[54] ELECTRONIC TOLL RESTRICTOR

[76] Inventors: George A. McCann, 339 Okaloosa Rd.; James E. Landis, 316 Stacy Cir.; Jimmie S. Kimbrell, 308 Stacy Cir., all of Walton Beach, Fla. 32548

[22] Filed: Mar. 21, 1972

[21] Appl. No.: 236,735

[52] U.S. Cl. .......... 179/90 D, 179/6.3 R
[51] Int. Cl. .......... H04m 1/66
[58] Field of Search .......... 179/6.3 R, 90

[56] References Cited

UNITED STATES PATENTS 3,676,597 7/1972 Peterson .......... 179/6.3 R
3,678,203 7/1972 Lorange .......... 179/6.3 R

*Primary Examiner*—Kathleen H. Claffy
*Assistant Examiner*—Ken Richardson
*Attorney*—John W. Malley et al.

[57] ABSTRACT

An apparatus for preventing unauthorized long distance calls from a conventional dial or push-button telephone including a switch connecting the telephone to the telephone lines, a counting circuit which counts the number of digits dialed and causes the switch to be opened when the count reaches eight, and a logic circuit which also causes the switch to be opened whenever the digit zero is among the first three digits dialed. The apparatus can be disposed either at the users facility or at a central telephone exchange.

12 Claims, 6 Drawing Figures

ELECTRONIC TOLL RESTRICTOR

BRIEF DESCRIPTION OF THE PRIOR ART AND SUMMARY OF THE INVENTION

The invention relates to an apparatus for preventing unauthorized long distance telephone calls.

The placing of unauthorized long distance telephone calls from telephones which are not leased by the individual placing the call has been a continual problem since the beginning of modern telephone systems. The problem has intensified by the increasing availability of individual phones in offices and other facilities of all types and with the adaption of automatic machinery for direct distance dialing so that the individual need not even lie to an operator when placing a call.

In the past, many devices have been developed for adaptation to individual telephones to prevent their unauthorized use. The U.S. Pat. Nos. to Von Stein, 3,358,897, and Evans, 3,284,578, disclose mechanical devices which are attached to individual telephones to actually lock the phones, preventing further dialing, after a given number of digits has been manually dialed. The U.S. Pat. No. to Stathacopolous, 3,513,271, shows a similar device in which relay logic is included for detecting whether a given number has been dialed. Other patents in the prior art include the U.S. Pat. Nos. to Heimann, 1,341,801, Marti, 2,216,850, and Aikawa, 3,511,939.

One difficulty with most devices which have been used in the past is the necessity to place elements within or attached to each individual telephone. Almost all telephones are actually owned by telephone companies which are normally loath to permit the leasers thereof to install mechanisms within the phone or mechanisms which might in any way impede the effectiveness or efficiency of the telephone system. Further, most devices in the prior art have been intended for use on each individual telephone. Since many office systems comprise thousands of individual phones, the expense of installing a device on each of the phones is very substantial. The increasing use of push-button phones, which generate unique audio tones or combinations of tones identifying each digit, presents a further problem in designing a mechanical device which is compatible with both push-button and dial phones.

The present invention relates to an apparatus for preventing such long distance telephone calls which can be installed either in association with an individual phone or at a telephone company's central exchange for monitoring all the calls which derive from a given set of phones, for example, in an office. Thus, only one device may be required for thousands of phones.

This apparatus includes a switch which connects one or more telephones to the telephone lines for completing a telephone call — long distance or local. A counting circuit is connected to the dial or the audio tone generating circuits of a telephone for counting the number of digits dialed and causing the switch to be opened when that count reaches eight. A further logic circuit is included for causing the switch to also be opened whenever the digit zero is among the first three digits selected.

In the direct distance system which is now in effect throughout the United States, at least 8 digits must be selected to complete a long distance call. Further, no valid local number has a zero within the first three digits since the digit zero is reserved for reaching the long distance operator and other purposes. Accordingly, opening the switch whenever either of these two conditions is detected operates to effectively prevent an individual from making an unauthorized long distance call.

According to the specific embodiment of the invention described below, the counting circuit includes a monostable multivibrator which is triggered by each digit which is selected by the user of the telephone. The pulses produced by this monostable multivibrator exceed in time duration the time interval between the adjacent pulses which are produced by a conventional dial telephone so that, irrespective of the number of pulses produced by such a dial telephone, that number identifying one digit, the monostable multivibrator produces only one pulse to increment by one the count in a plurality of flip-flops forming a counter. The same multivibrator can be used in connection with a push-button telephone.

A further flip-flop having first and second output conditions is connected to the flip-flops counting the number of digits selected to generate a logical output condition which changes after three digits have been dialed. In the embodiment for use with dial telephones, this flip-flop is connected as one input to a logic gate with the other input connected to the pulse generating circuit for a dial telephone. The output of the logic gate is connected to a plurality of flip-flops which count the number of pulses generated by manual operation of the dial and produce an output signal which drives a monostable multivibrator which in turn operates a relay to open the switch whenever the digit zero is among the first three digits dialed.

In the embodiment which is designed for use with a push-button type telephone, the combination of audio tones which is identified with the digit zero is detected to produce a signal which is applied to a logic gate together with the output of the flip-flop which shifts its output condition after three or more digits have been selected. The output of this gate is similarly applied to the one shot multivibrator, which produces a pulse operating the relay to open the switch in the same fashion as above.

From the above, it should be apparent that essentially the same circuit can be used with both types of telephones and provides a simple and effective device for preventing unauthorized long distance telephone calls without in any way affecting the normal operation of the telephones or adding mechanisms within or on individual telephones.

Many other objects and purposes of the invention will become clear from the following detailed description of the drawings.

DETAILED DESCRIPTION OF THE DRAWINGS

Figure 1A:
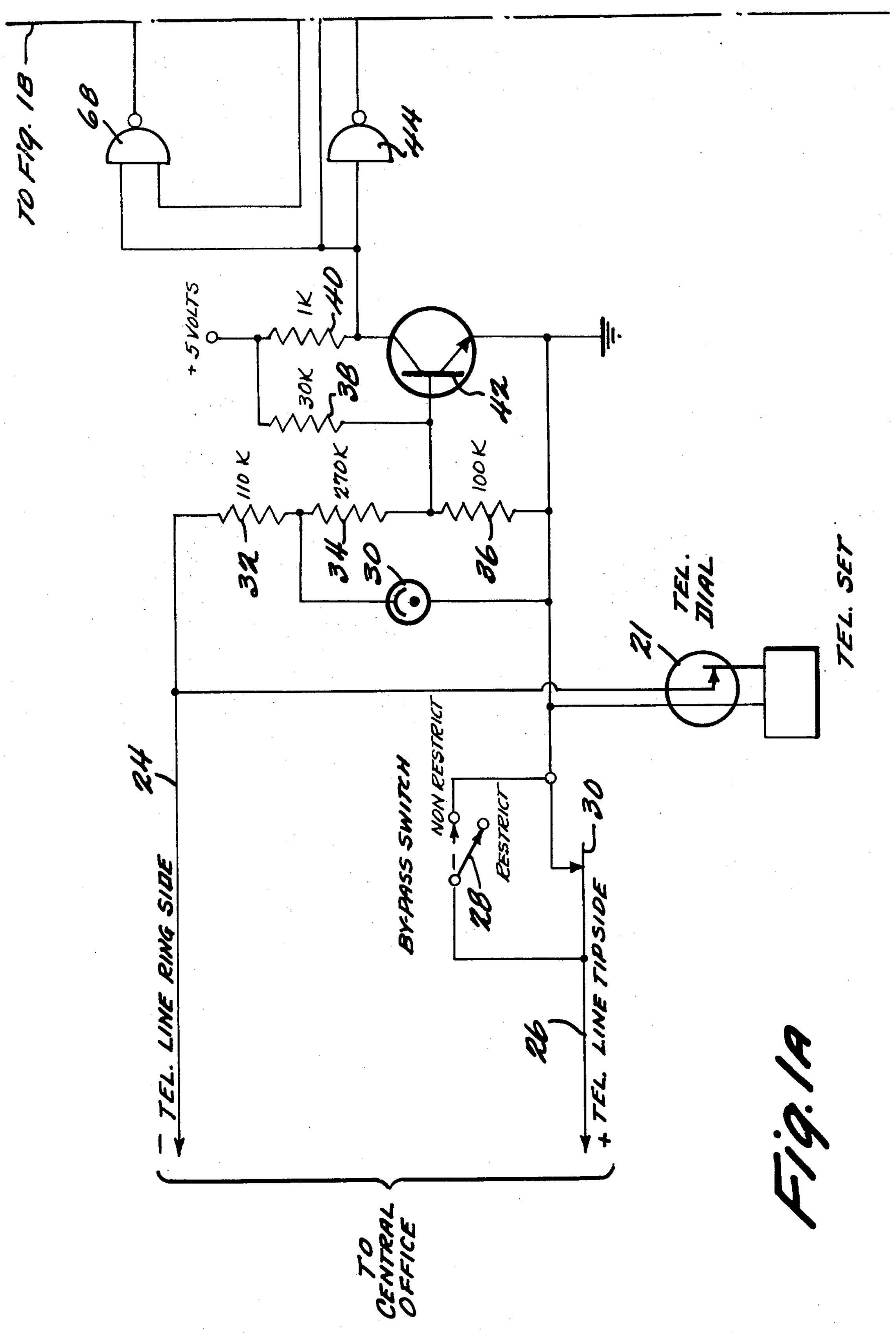
FIGS. 1A and 1B show a schematic of one embodiment of the invention for use with a dial telephone for preventing unauthorized long distance telephone calls.
Figure 1B:
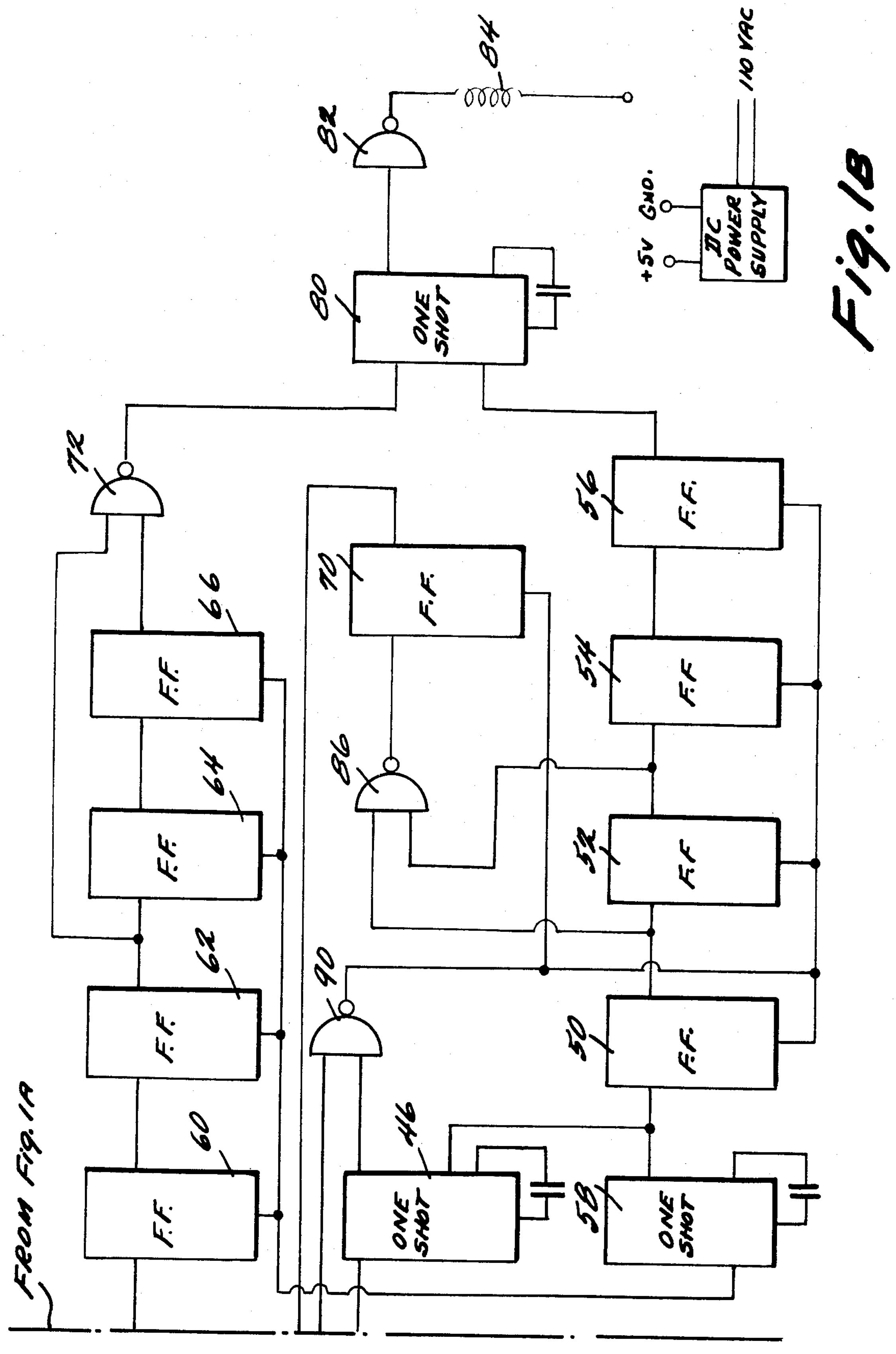

Reference is now made to FIGS. 1A and 1B which illustrates a first embodiment of this invention for use with a conventional dial telephone which is diagrammatically illustrated in FIG. 1, and which is provided with a conventional dial 21 of the type which is manually rotatable and which is returned to its initial position by a spring, generating pulse train with the number of pulses in that train identifying the digit which has been dialed. Dial 21 is conventionally connected to telephone lines 24 and 26 for connecting the telephone set 20 to a central office which completes the call initiated by operation of dial 21.

However, as a part of the apparatus illustrated in FIGS. 1A and 1B for preventing unauthorized telephone calls, a manually operable switch 28 is connected in line 26 between the central office and telephone dial 21. Switch 28 has a closed unrestricted position which bypasses switch 30 which is controlled by a relay as described below and a second open restricted position. Switch 28, which would normally be located so as not to be inaccessible or unusable by an individual using the telephone, can be manually operated by one having proper authority to quickly and simply shift from a nonrestricted to a restricted use of telephone 20 and vice versa. Switch 28 might, for example, be shifted to a restricted use position each evening when the office facilities close, rendering the circuit of FIG. 1 operative.

A conventional device 29 operates to shunt the ringing voltage around the device to prevent it from counting the number of cycles as digits. Input resistors 32, 34, 36, 38 and 40 provide the proper voltage for driving transistor 42 alternately from its conductive to its nonconductive state to generate a pulse train at the collector of transistor 42 with the number of pulses in a train identifying the digit which is dialed.

Figure 2:
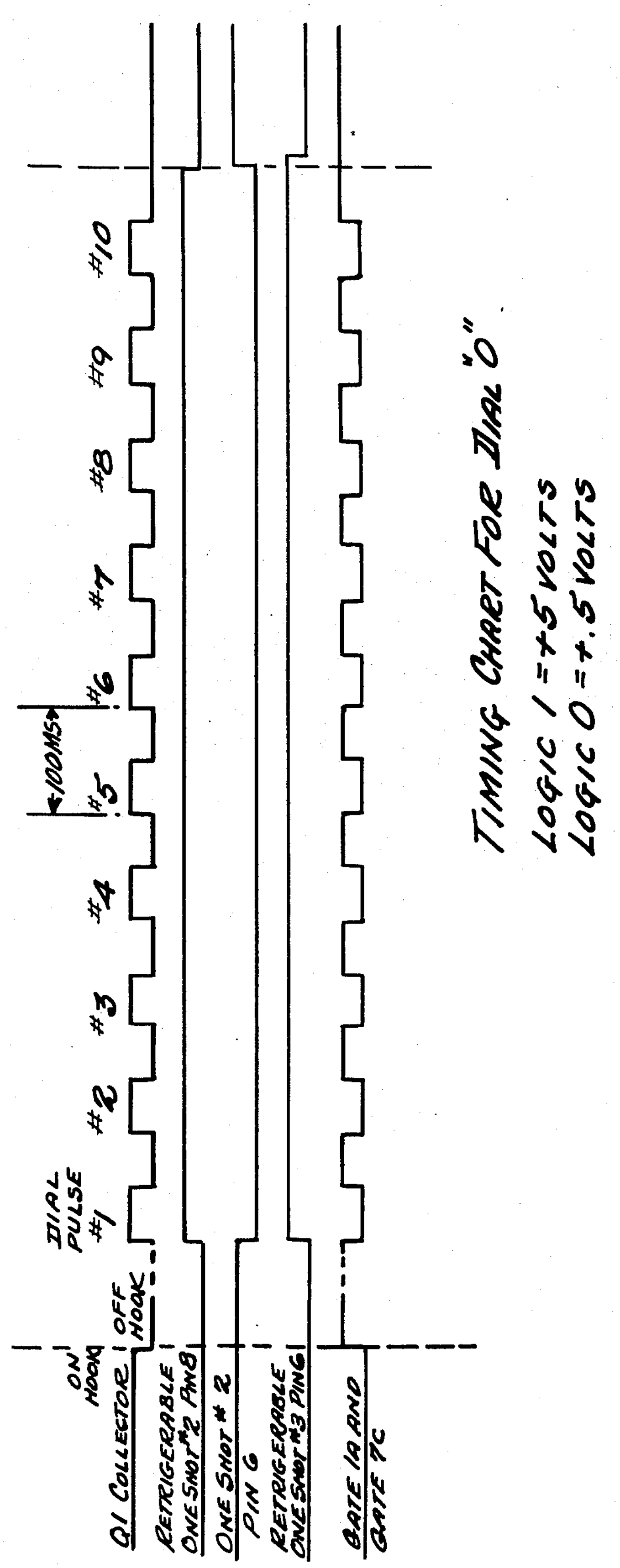
FIG. 2 shows a timing chart for the signals produced by the circuit of FIG. 1.

The output of transistor 42 is inverted by conventional NAND gate 44 and applied as one input to a monostable multivibrator 46 which produces a pulse having a duration which is greater than the duration between adjacent pulses produced by transistor 42 so that multivibrator 46 continues to produce its pulse as can be seen in FIG. 2 until the cessation of the pulse train produced by transistor 42. The pulse produced by monostable multivibrator 46 is applied to a counting circuit comprised of conventional flip-flops 50, 52, 54 and 56 to increment the count stored therein indicating the number of individual digits which has been dialed. The output of monostable multivibrator 46 is also applied to a further multivibrator 58 which produces a short pulse at the trailing edge of the pulse from multivibrator 46 which is applied to the reset inputs to conventional flip-flops 60, 62, 64 and 66 which operate to check each of the first three digits to determine if a zero has been dialed.

The pulse train produced by transistor 42 is also applied as one input to NAND gate 68, with the other input being connected to the output of flip-flop 70 which, as will be apparent from the discussion below, is shifted from one logical output condition to the other logical condition when the digits which have been counted by flip-flops 50, 52, 54 and 56 equals three in number. For the first three digits, gate 68 is enabled to pass the pulses produced by transistor 42 to flip-flops 60, 62, 64 and 66 which count the number of individual pulses.

In conventional dial systems now in use, dialing the digit zero produces ten pulses as can be seen in the FIG. 2. If these ten pulses which identify digit zero are produced by transistor 42 during the first three digits dialed, then NAND gate 72 is enabled to produce an output which is applied as one input to monostable multivibrator 80 to cause that device to in turn produce an output pulse which is inverted by NAND gate 82 and applied to conventional relay 84. Relay 84 then operates its controlled switch 30 to open that switch and interrupt the electrical connnection between telephone set 20 and the central office via lines 24 and 26 so that dial tone is returned to the user of the telephone and the unauthorized telephone call cannot be completed.

Each digit that is dialed causes monostable multivibrator 46 to be triggered and to continue its output pulse for the duration of the pulse train, producing a signal which increments the count in flip-flops 50, 52, 54, and 56 by one. Flip-flop 70 is connected to flip-flops 50, 52, 54 and 56 by NAND gate 86 which applies a signal to flip-flop 70 to cause it to shift from a first to a second output condition whenever the count stored in flip-flops 50, 52, 54 and 56 is three or greater. This shift in output condition of flip-flop 70 disables NAND gate 68 so that flip-flops 60, 62, 64 and 66 no longer receive the pulses from transistor 42. Accordingly, the digit zero can be dialed without operating switch 30 after the first three digits.

Further, flip-flops 50, 52, 54 and 56 are connected to monostable multivibrator 80 to cause that multivibrator to produce an output pulse whenever the count in flip-flops 50, 52, 54 and 56 reaches eight, indicating that eight digits have been dialed and that a long distance call is being attempted. In the same fashion as described above, the pulse produced by the multivibrator 80 as inverted by gate 82 causes relay 84 to momentarily open switch 30, interrupt the telephone connection and return dial tone to the telephone set 20.

At the end of each pulse train which is associated with a given digit, multivibrator 46 shifts back to its initial condition, triggering one shot 58 which resets flip-flops 60, 62, 64, and 66 for counting the number of pulses in the next digit which is chosen. After the telephone is returned to the hook, transistor 42 returns to its normally nonconductive condition, applying a high signal as one input to NAND gate 90 with the other input being connected to the output of one shot multivibrator 46 which maintains its pulse for a short time as shown in FIG. 2. Thus, when the telephone is returned to the hook NAND gate 90 provides a signal to the reset inputs to flip-flops 50, 52, 54, and 56 and 70 to reset those flip-flops to their initial condition and prepare to count further digits which are thereafter selected in an attempt to place a further telephone call.

Figure 3A:
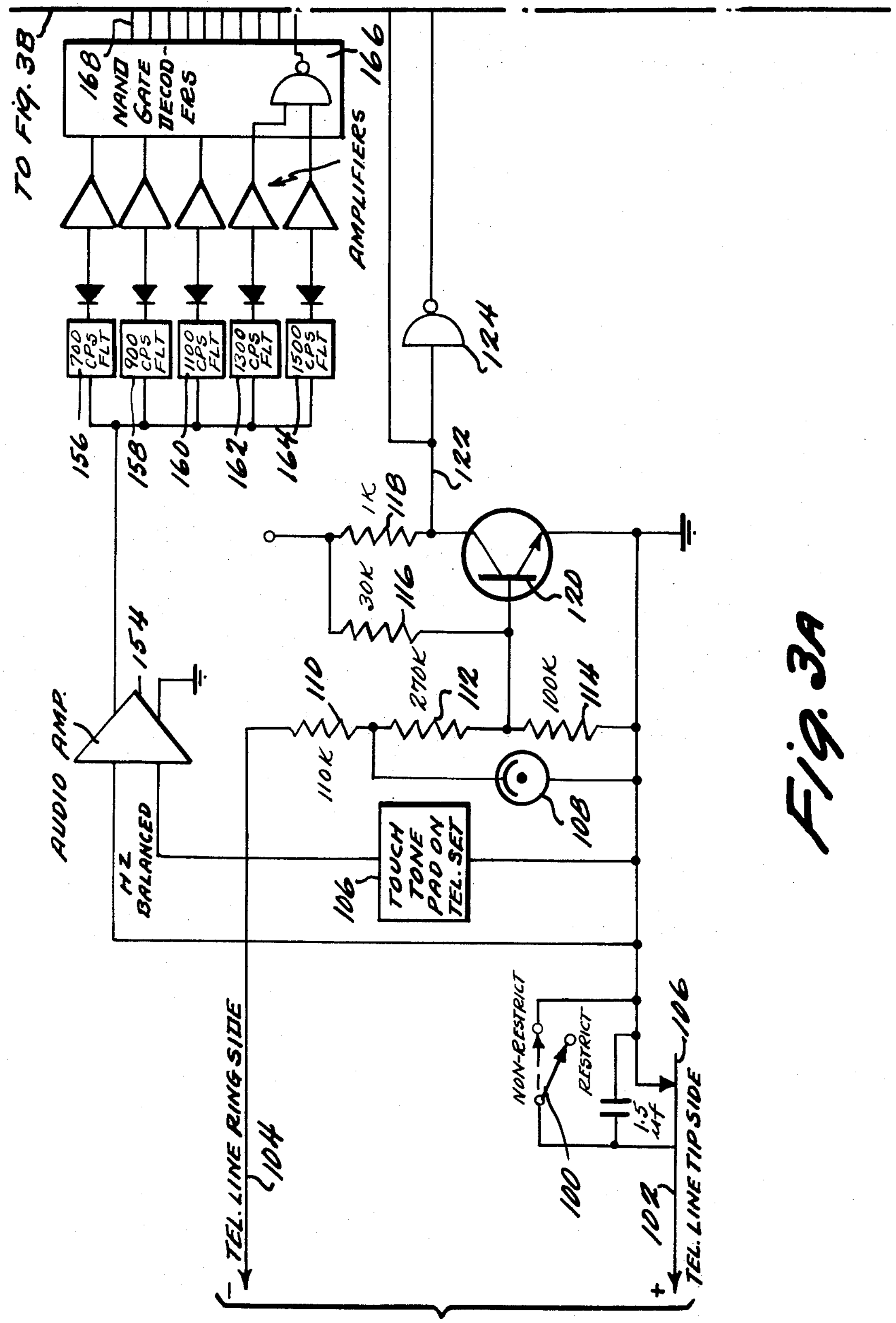
FIGS. 3A and 3B shows a modification of the circuit of FIG. 1 for use with a push-button telephone.
Figure 3B:
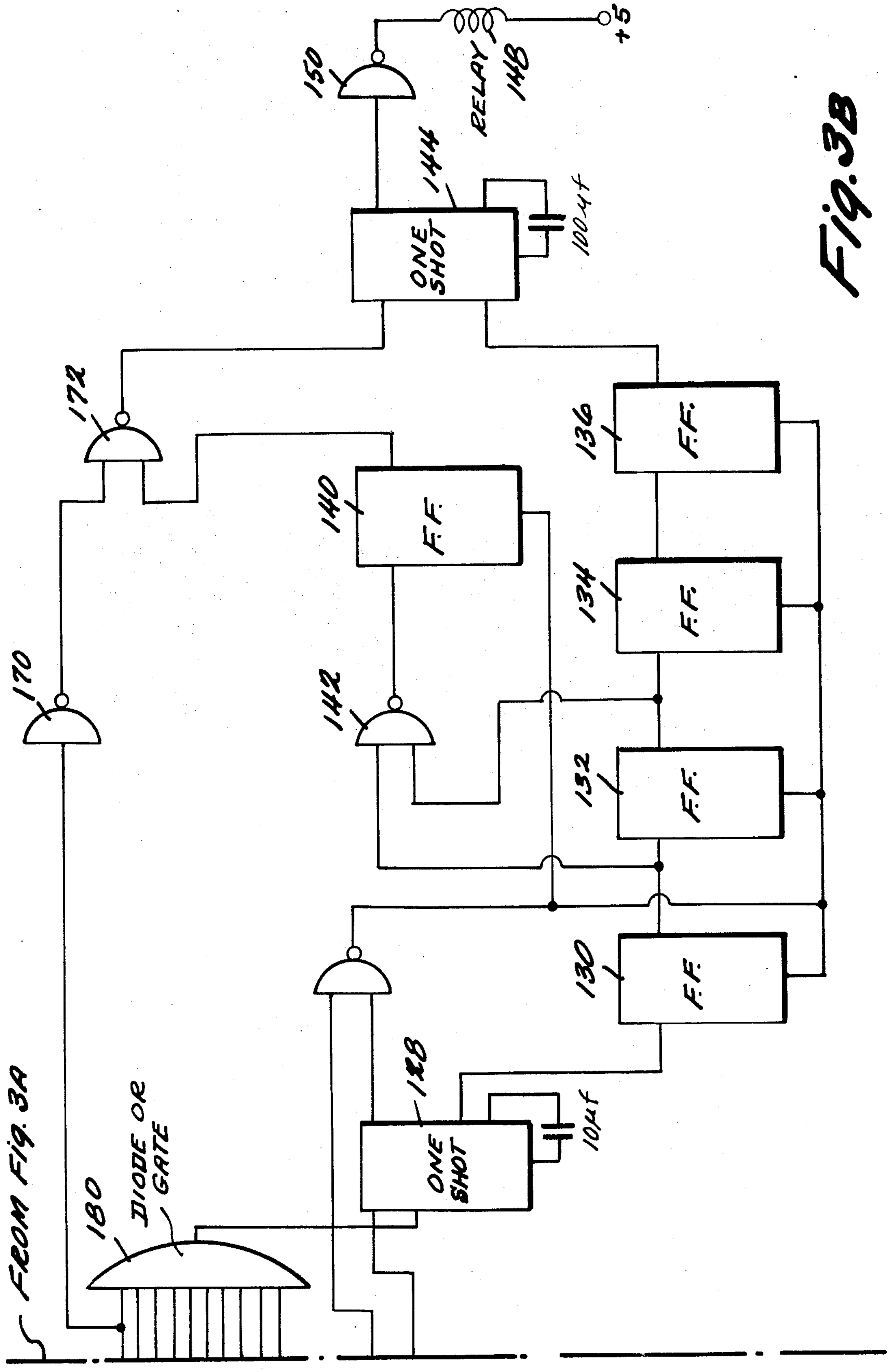

Reference is now made to FIGS. 3A and 3B which illustrates a modification of the circuit of FIGS 1A and 1B suitable for use with a push-button telephone. As can be seen, these modifications are not substantial and essentially the circuit can be employed for both types of telephones even though the signals produced denoting the individual digits are quite different. As in the embodiment of FIGS. 1 and 1B, a manually operable switch 100 is provided in line 102, which together with line 104, connects the telephone set diagrammatically illustrated as 106 to a central exchange for completing a call. A switch 107, which is controlled by a relay in the same fashion as in FIGS. 1A and 1B, is connected in parallel with manually operable switch 100 for disconnecting the telephone from the lines 102 and 104 whenever switch 100 is in its restrictive position and a long distance call is attempted.

As in the embodiment of the FIGS. 1A and 1B, device 108 is connected with resistors 110, 112, 114, 116 and 118 for providing appropriate pulses to transistor 120 which shifts between its conductive and its non-conductive position applying a pulse to line 122 which is inverted by NAND gate 124 and applied as one input to monostable multivibrator 128. As in the embodiment of FIG. 1, monostable multivibrator 128 produces an output signal by which is applied to flip-flops 130, 132, 134, and 136 which operate to count the number of digits which have been selected. Flip-flops 130, 132, 134 and 136 are connected as shown to flip-flop 140 by NAND gate 142 for causing that flip-flop to shift from one output condition to another after three digits have been selected. Flip-flops 130, 132, 134, and 136 are also connected to a conventional monostable multivibrator 144 to cause that multivibrator to produce an output pulse which is applied to relay 148 via NAND gate 150 to cause switch 107 to be opened for a short interval to return dial tone to the user of telephone 107 and prevent the completion of the long distance telephone call.

A conventional audio amplifier 154 is also connected to the lines 104 and 106 to amplify the audio tones produced by operation of the push button telephone. The output of amplifier 154 is applied to a plurality of conventional filters including filters 156, 158, 160, 162, and 164 which may, for example, detect 700, 900, 1100, 1300, 1500 cycles per second respectively. Each digit is normally associated with a unique combination of these frequencies. Each such combination is detected by a group of conventional NAND gates indicated as 166 which provide an output on one of ten lines indicating the digit which has been selected. The selection of the digit zero produces an output signal on line 168 which is inverted by NAND gate 170 and applied as one input to NAND gate 172. The other input to NAND gate 172 is connected to the output of flip-flop 140 so that NAND gate 172 produces a signal triggering monostable multivibrator 144 whenever the digit zero is selected among the first three digits.

The signal produced by decoder 166 is also applied to a conventional OR gate 180 which produces a signal when any of these digits are selected to cause monostable multivibrator 128 to shift its output condition in the same way as illustrated in FIG. 2 to increase the count in flip-flops 130, 132, 134 and 136.

Figure 4:
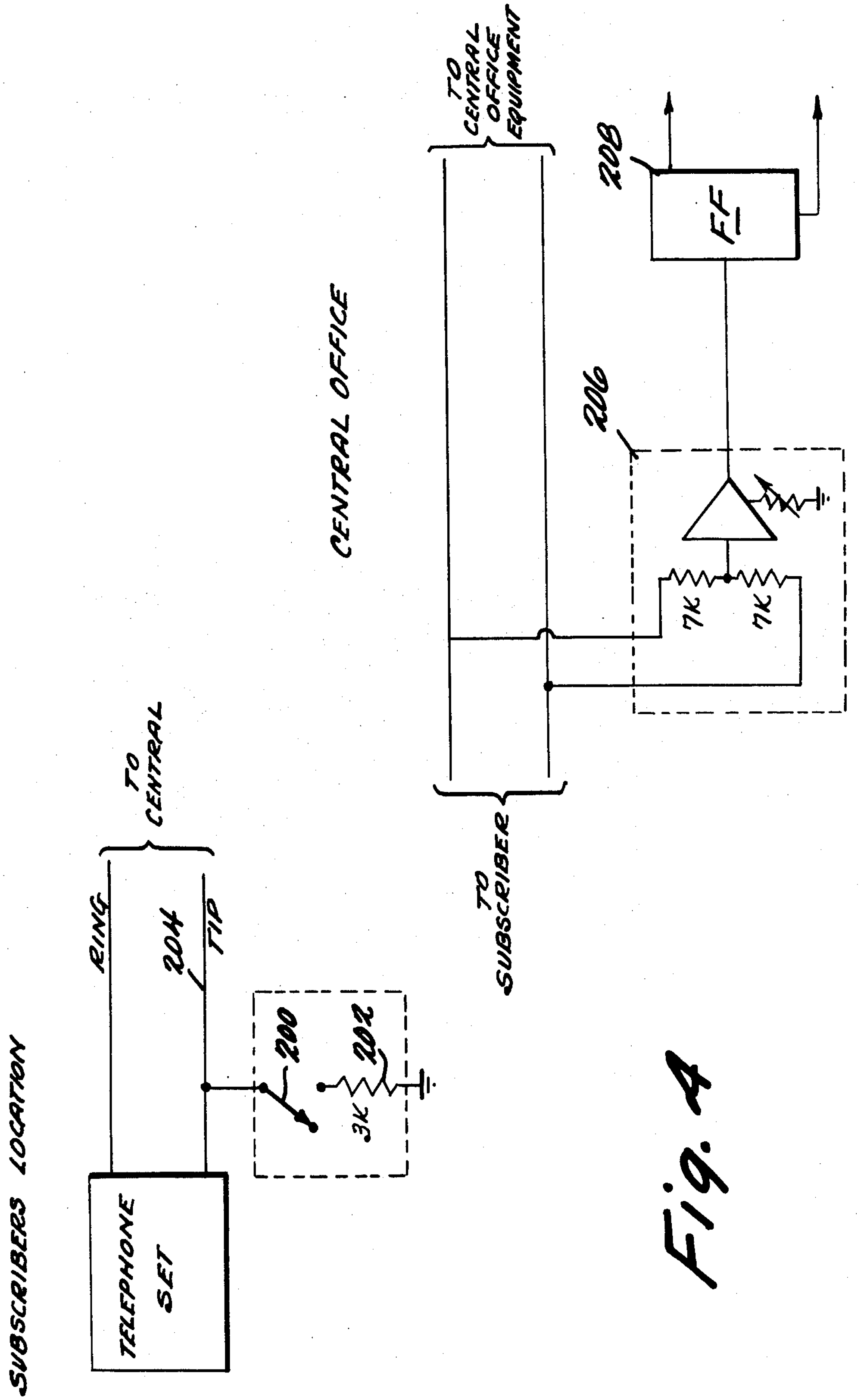
FIG. 4 shows a block diagram of the novel circuit of this invention connected in a telephone office central exchange.

Reference is now made to FIG. 4 which illustrates in block diagram how the novel system of this invention can be installed in the central telephone office rather than at the individual subscriber's location. By such an arrangement, the telephone company itself can offer this capability as a service to its users at a relatively inexpensive price with only one device being required for each subscriber's system, irrespective of how many individual telephone systems are associated with the system. As shown in FIG. 4, the system preferably includes a switch connected between the switchboard of the user or his telephone set and the central office, preferably at the subscriber's location. Switch 200 is preferably a switch operated with a key and can be shifted from an opened to a closed position, applying a resistive load 202, for example of 3 K ohms to line 204 which, as illustrated, is the tip telephone line.

At the central facility the position of switch 200 is detected by a conventional differential amplifier circuit 206 which produces an output indicating whether the restrictor is in use or not. If the restrictor is disabled, an output of zero volts will be produced by the differential amplifier whereas when switch 200 is closed a positive voltage, for example of 5 volts in the embodiment shown in this application, will be produced because the lines have become unbalanced by the addition of the resistive load 202.

The output of the differential amplifier 206 is applied to a conventional flip-flop 208 which in a first condition renders the circuit of the FIGS 1 to 2 operative and in a second condition renders it inoperative. Thus, the circuit can be installed at the central facility and automatically operated by the user at his remote location to cause the restrictor to be placed in use, for example during the evening hours.

Many changes and modifications in the above described embodiments of the invention can, of course, be made without departing from the scope of the invention. Accordingly, that scope is intended to be limited only by the scope of the appended claims.

What is claimed is:

1. Apparatus for preventing unauthorized long distance telephone calls through telephone lines to a central telephone facility from a telephone having digit generating means for producing a plurality of digit signals each associated with one digit, said plurality of digits defining a telephone number including:

- switch means having a first position connecting said telephone to said telephone lines for permitting transmission of telephone signals and a second position disconnecting said telephone from said telephone lines for preventing transmission of telephone signals,
- means connected to said digit generating means for receiving said digit signals, counting the number of digits produced and storing the current count,
- first logic means connected to said receiving, counting and storing means for shifting from a first to second condition following when said receiving, counting and storing means stores a count of three, and no later than when said receiving, counting and storing means stores a count of four,
- second logic means connected to said first logic means and to said digit generating means for producing a given output signal when said first logic means is in said first condition and said digit producing means produces a digit signal associated with the digit zero,
- third logic means connected to said second logic means and to said receiving, counting and storing means for producing a disabling signal whenever said second logic means produces said given output signal or said receiving, counting and storing means stores a count of eight indicating that eight digit signals have been produced by said digit generating means,
- switch controlling means connected to said third logic means for receiving said disabling signal and causing said switch means to shift from said first to said second position whenever said disabling signal is received, and means connected to said receiving, counting and storing means, and said first logic means for causing the count stored in said receiving, counting and storing means to be reset to zero, and said first logic means to be shifted from said second to said first condition after said disabling signal is produced.

2. Apparatus as in claim 1 further including means connected to said digit signal producing means for generating at least a single electrical pulse for each digit signal produced and wherein said receiving, counting and storing means includes a monostable multivibrator connected to said pulse generating means for producing, upon receipt of the first pulse from said digit generating means, a pulse having a duration greater than the duration from the first to the last of all of the pulses generated for any given digit signal, and a plurality of flip-flops connected to said monostable multivibrator and to each other to accumulate a count and increase that count by one when said longer duration pulse is produced by said monostable multivibrator.

3. Apparatus as in claim 2 wherein said first logic means includes a given flip-flop having an input connected to said flip-flops of said receiving, counting and storing means and having an output establishing a first output condition when the count in said receiving, counting and storing means is three or greater and a second output condition when the count in said receiving, counting and storing means is less than three.

4. Apparatus as in claim 3 wherein said causing means includes a further monostable multivibrator connected to said monostable multivibrator in said receiving, counting and storing means for producing a further pulse upon the termination of the pulse produced by said multivibrator of said receiving, counting and storing means and means connecting said further multivibrator to said flip-flop of said second logic means for transmitting said further pulse to cause that flip-flop to shift from its second to first output condition upon receipt of said further pulse.

5. Apparatus as in claim 4 wherein said third logic means includes a monostable multivibrator having inputs connected to the flip-flops of said receiving, counting and storing means and to said second logic means for producing a given pulse whenever said second logic means produces said given output signal or said receiving, counting and storing means stores a count of eight and wherein said causing means includes a relay connected to said multivibrator of said third logic means for causing said switch means to open while said relay is receiving said given pulse from said multivibrator of said third logic means.

6. Apparatus as in claim 5 wherein said digit signal generating means generates a pulse train comprising each digit signal with the number of pulses identifying the digit and ten pulses being associated with the digit zero and wherein said second logic means includes a plurality of flip-flops interconnected for counting and for providing a predetermined output signal when the count therein reaches ten, a logic gate having its output connected to said plurality of flip-flops of said second logic means, one input connected to said digit signal generating means and other input connected to said given flip-flop of said second logic means for passing said pulses from said digit signal generating means to said plurality of flip-flops of said second logic means when said given flip-flop is in said first condition and not passing said pulses from said digit signal generating means when said given flip-flop is in said second condition.

7. Apparatus as in claim 5 wherein said digit signal generating means generates a signal having unique frequency component identifying each digit and wherein said second logic means includes means connected to said digit signal generating means for producing a predetermined output signal when the signal associated with the digit zero is produced, a logic gate having one input connected to the output of said predetermined signal producing means and another input connected to the output connected to said given flip-flop of said second logic means and having its output connected to said monostable multivibrator of said third logic means for passing a signal to said monostable multivibrator of said third logic means for causing that multivibrator to produce said given pulse when said logic gate passes said signal.

8. Apparatus as in claim 7 further wherein said predetermined signal producing means includes an audio frequency filter.

9. Apparatus as in claim 1 further including said telephone.

10. Apparatus as in claim 1 further including manually operable switch means connected to said lines and having a first position enabling said apparatus and a second position disabling said apparatus.

11. Apparatus as in claim 10 wherein said apparatus is disposed at the central telephone facility and further including means at said facility for detecting the position of said manually operable switch means.

12. Apparatus as in claim 11 wherein said manually operated switch unbalances said lines in said first position and said detecting means includes means for detecting said unbalance.

* * * * *